United States Patent
Lee

(10) Patent No.: US 7,701,162 B2
(45) Date of Patent: Apr. 20, 2010

(54) METHOD FOR CONTROLLING STEPPING MOTOR

(75) Inventor: Jong-Jin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1491 days.

(21) Appl. No.: 11/038,085

(22) Filed: Jan. 21, 2005

(65) Prior Publication Data

US 2005/0174910 A1 Aug. 11, 2005

(30) Foreign Application Priority Data

Feb. 10, 2004 (KR) ........................ 10-2004-0008648

(51) Int. Cl.
*H02P 8/00* (2006.01)

(52) U.S. Cl. ................ 318/696; 369/44.11; 369/44.14; 369/44.17; 360/78.13

(58) Field of Classification Search ................ 318/696, 318/685, 67, 68, 90, 257, 262, 268, 280, 318/400.01; 360/78.13; 369/30.74, 30.8, 369/44.11, 44.14, 44.17
See application file for complete search history.

(56) References Cited

U.S. PATENT DOCUMENTS

| | | | | |
|---|---|---|---|---|
| 4,489,259 A | * | 12/1984 | White et al. ................. | 318/696 |
| 4,518,904 A | * | 5/1985 | MacLeod et al. ............. | 318/685 |
| 4,518,907 A | * | 5/1985 | Giguere ...................... | 318/696 |
| 5,378,975 A | * | 1/1995 | Schweid et al. ............. | 318/685 |
| 6,009,292 A | * | 12/1999 | Jinbo et al. .................. | 399/208 |
| 6,118,963 A | * | 9/2000 | Fujikura et al. ............. | 399/167 |
| 6,152,626 A | * | 11/2000 | Yanagi et al. ................ | 400/279 |
| 6,222,340 B1 | * | 4/2001 | Kawabata et al. ........... | 318/685 |

(Continued)

FOREIGN PATENT DOCUMENTS

CN 1262810 8/2000

(Continued)

OTHER PUBLICATIONS

Chinese Office Action issued May 26, 2006, in Chinese Patent Application No. 2005100082233 which corresponds to U.S. Appl. No. 11/038,085.
Office Action Issued by Korean Patent Office Aug. 19, 2005.

*Primary Examiner*—Bentsu Ro
*Assistant Examiner*—Antony M Paul
(74) *Attorney, Agent, or Firm*—Staas & Halsey LLP

(57) ABSTRACT

There is provided a method for controlling a stepping motor by employing a micro-step mode at deceleration or acceleration of the stepping motor, which moves an optical pickup head in a full step mode or a half step mode, to minimize lens vibration of the optical pickup head. The method includes setting an initial step of the stepping motor, applying a micro-step mode to the stepping motor at the set initial step to move the optical pickup head, and after the initial step, applying a full step mode or a half step mode to the stepping motor to accelerate the optical pickup head by a desired speed. Also, the method includes setting a late step of the stepping motor, applying a full step mode or a half step mode to the stepping motor to decelerate the optical pickup head by a desired speed, and applying a micro-step mode to the stepping motor at the set late step to move the optical pickup head.

19 Claims, 2 Drawing Sheets

U.S. PATENT DOCUMENTS

| | | | |
|---|---|---|---|
| 6,555,985 B1 * | 4/2003 | Kawabata et al. | 318/685 |
| 6,597,147 B2 * | 7/2003 | Li et al. | 318/696 |
| 6,642,687 B2 * | 11/2003 | Aoshima | 318/696 |
| 6,713,985 B2 * | 3/2004 | Aoshima | 318/696 |
| 6,747,434 B2 * | 6/2004 | Pigott et al. | 318/696 |
| 6,984,956 B2 * | 1/2006 | Kang et al. | 318/685 |
| 2003/0206502 A1 * | 11/2003 | Lin | 369/30.15 |
| 2005/0013220 A1 * | 1/2005 | Seo | 369/47.36 |

FOREIGN PATENT DOCUMENTS

| | | |
|---|---|---|
| JP | 07-272291 | 10/1995 |
| JP | 8-149892 | 6/1996 |
| JP | 10-334474 | 12/1998 |
| JP | 2000-137525 | 5/2000 |
| JP | 2001-76448 | 3/2001 |
| JP | 2002-010690 | 1/2002 |

* cited by examiner

METHOD FOR CONTROLLING STEPPING MOTOR

CROSS-REFERENCE TO RELATED APPLICATION

This application claims the benefit of Korean Patent Application No. 2004-8648, filed on Feb. 10, 2004 in the Korean Intellectual Property Office, the disclosure of which is incorporated herein in its entirety by reference.

BACKGROUND OF THE INVENTION

1. Field of the Invention

The present invention relates to a method for driving an optical disk drive, and more particularly, to a method for controlling a stepping motor by using a micro-step mode at deceleration or acceleration of the stepping motor, which moves an optical pickup head in a full step mode or a half step mode, to minimize lens vibration of the optical pickup head.

2. Description of the Related Art

A conventional optical disk drive places an optical pickup head on a disk by driving a stepping motor in a full step mode, a half step mode or a micro-step mode. By driving the stepping motor in the full step mode or the half step mode, the optical pickup head is moved faster than that of the micro-step mode since these modes have a vector quantity larger than that of the micro-step mode.

In the conventional optical disk drive, when the movement of optical pickup head is accelerated in the full step mode or the half step mode, a lens of the head is significantly vibrated at the time of accelerating so that the vibration may cause an unstable condition to control the lens. Similarly, in the conventional optical disk drive, when the optical pickup head is decelerated in the full step mode or the half step mode, the lens also experiences a significant vibration at the time deceleration, so that it may cause an unstable condition to control the lens.

In order to solve the above problems, a latency time is given to the lens when the full step mode or the half step mode is applied, so that the lens can stably operate. However, there is a problem with this solution in that a time to move the optical pickup head of the stepping motor slows down.

SUMMARY OF THE INVENTION

Additional aspects and/or advantages of the invention will be set forth in part in the description which follows and, in part, will be obvious from the description, or may be learned by practice of the invention.

According to an aspect of the present invention provides a method of controlling a stepping motor by employing a micro-step mode at the point in time of deceleration or acceleration of the stepping motor, which moves an optical pickup head in a full step mode or a half step mode, to minimize lens vibration of the optical pickup head.

According to an aspect of the present invention, there is provided a method of controlling a stepping motor to move an optical pickup head, the method comprising: setting an initial step of the stepping motor; applying a micro-step mode to the stepping motor at the set initial step to move the optical pickup head; and after the initial step, applying a full step mode or a half step mode to the stepping motor to accelerate the movement of optical pickup head by a predetermined speed.

The number of the micro-step mode may be sequentially reduced, and the reduced number of the micro-step mode may be applied to each step of the set initial stage.

According to another aspect of the present invention, there is provided a method for controlling a stepping motor to move an optical pickup head, the method comprising: setting a late step of the stepping motor; applying a full step mode or a half step mode to the stepping motor to decelerate the optical pickup head to a predetermined speed; and applying a micro-step mode to the stepping motor to move the optical pickup head; and the late step of the stepping motor may be set as a plurality of steps on the basis of the half step mode.

The number of the micro-step mode may be sequentially reduced, and the reduced number of the micro-step mode may be applied to each step of the set late stage.

According to an aspect of the present invention, at the acceleration or deceleration of the stepping motor to move the optical pickup head, the micro-step mode is applied to the stepping motor, thereby minimizing the lens vibration of the optical pickup head. Accordingly, the lens of the optical pickup head is stabilized, so that the time to stably servo the lens can be quickly applied in relation to the prior art.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
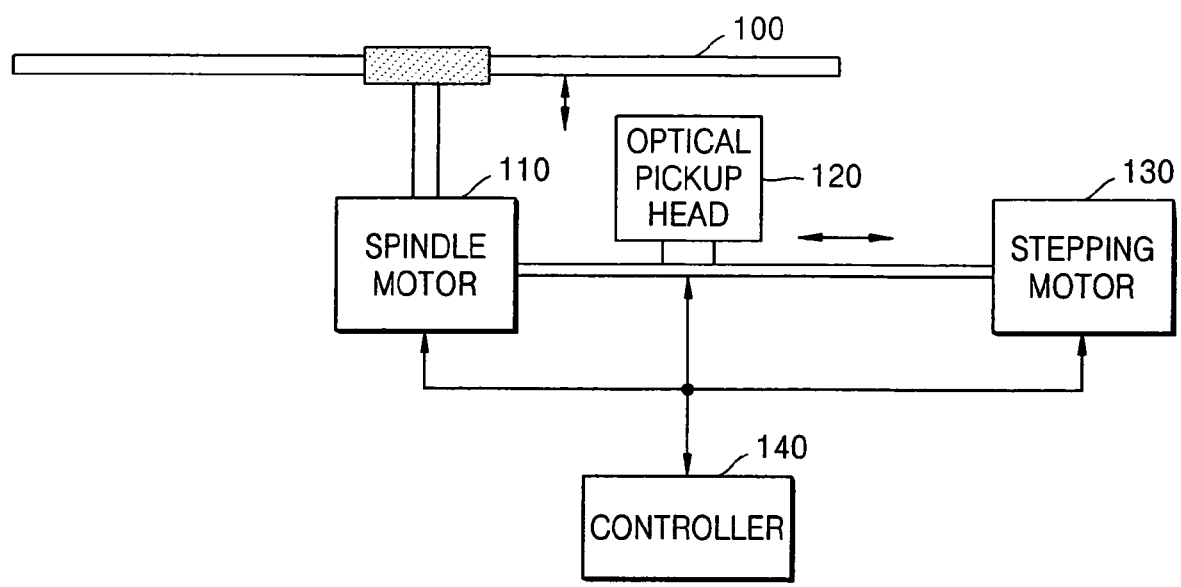
FIG. 1 is a block diagram of an optical disk drive, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 is a block diagram of an optical disk drive including an optical disk 100, a spindle motor 110, an optical pickup head 120, a stepping motor 130, and a controller 140 according to an embodiment of the invention.

Figure 2:
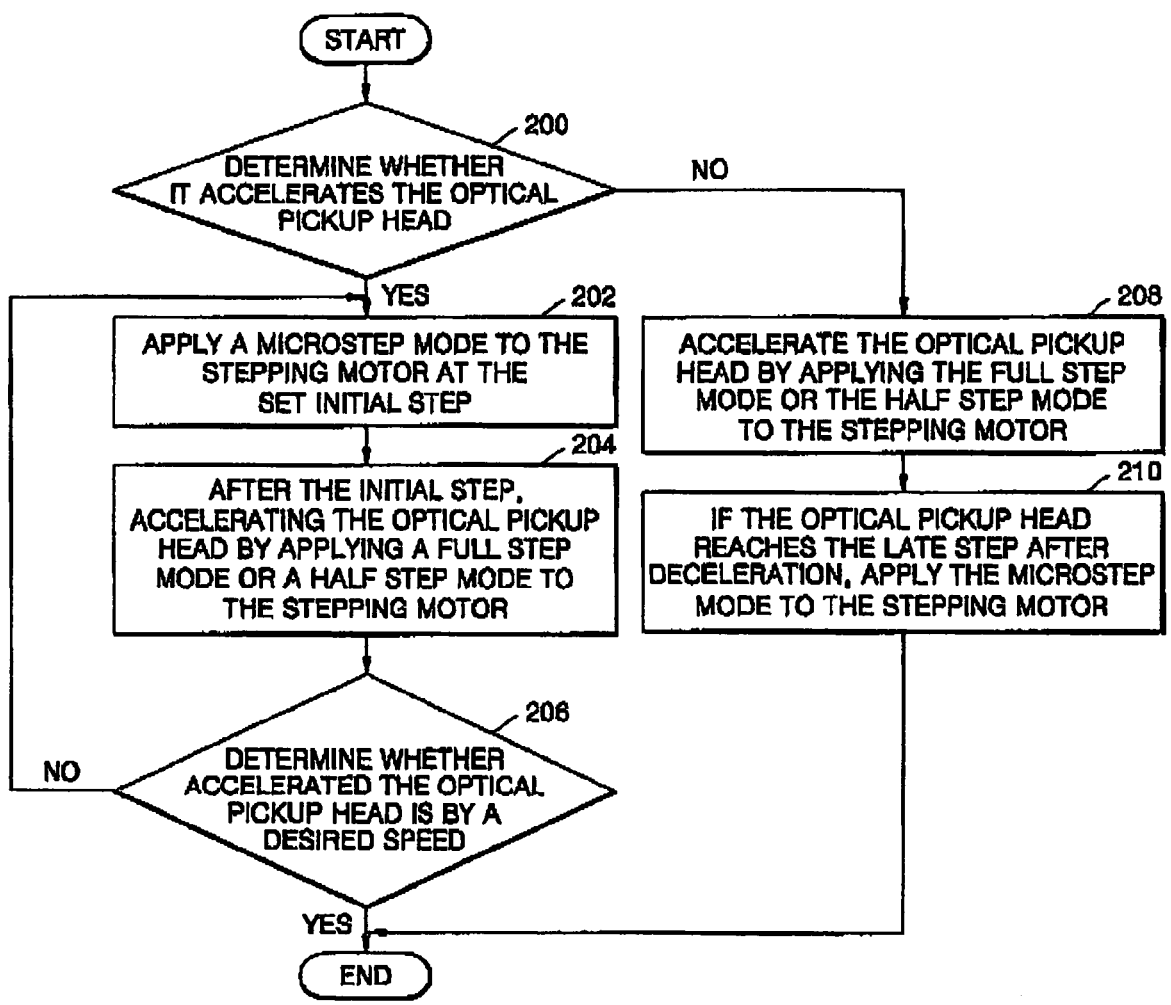
FIG. 2 is a flowchart depicting a method for controlling a stepping motor, according to an embodiment of the present invention.

FIG. 2 is a flowchart depicting a method for controlling a stepping motor according to an embodiment of the present invention. While not requiring the method can be implemented as a computer program or firmware readable by the controller 140, which can be a general or special purpose computer.

The method can comprise determining whether the optical pickup head 120 is to be accelerated (S200). If the pickup head 120 is being accelerated, an initial step of the stepping motor 130 can be set. A micro-step mode can be applied to the stepping motor 130 (S202), e.g., at the set initial step, and after the initial step, accelerating the optical pickup head 120 by applying a full step mode or a half step mode to the stepping motor 130 (S204). It is then determined whether the optical pickup head 120 is accelerated to a predetermined/desired speed (S206). Alternatively, in the case of decelerating the optical pickup head 120, as determined in operation 200, a potential setting of a decelerating step mode of the stepping motor to 130 to decelerate the optical pickup head 120 can be implemented in operation 208, potentially including applying the full step mode or the half step mode to the stepping motor 130 (S208). If the optical pickup head reaches the late step after deceleration, applying the micro-step mode to the stepping motor 130 to move the optical pickup head 120 to a second predetermined speed (S210), and thereafter potentially determining whether the optical pickup head 120 has decelerated to a desired speed.

A method for controlling the stepping motor 130 according to aspects of the invention will now be described in detail with reference to FIGS. 1 through 2. The spindle motor 110 rotates the optical disk 100 under a control of the controller 140. The optical pickup head 120 moves the optical disk 100 in response to a command of the controller 140 to read and/or write data with respect to the optical disk 100, or to perform the interested command. The stepping motor 130 moves the optical pickup head 120 under the control of the controller 140.

The stepping motor 130 rotates in a given step size and a given step angle according to one input pulse to move the optical pickup head. The stepping motor 130 has several advantages as followings: since an open-loop control is directly performed by a digital signal, a system is simple; a precise control can be performed without utilizing a feedback system to control a position or speed; since a rotational speed is obtained in relation to a frequency of a pulse signal, a speed can be widely controlled; starting, stopping, and forward/backward rotation can be easily operated; a rotational angle is completely relative to the number of input pulse; an angle error is small, and the error is not accumulated; a high holding torque is produced at the stopping; it can be operated at high torque and ultra low speed; since the number of motor components are small, its reliability is high; and it is inexpensive. However, it is understood that other aspects and advantages can be achieved using motors other than stepper motors can be used with the invention which accomplish one of more of the above advantages.

Methods of driving for a stepping motor 130 may be divided into a full step mode, a half step mode, and a micro-step mode based on the step size rotating for 360 degrees. Specifically, the full step mode is to drive the stepping motor 130 by concurrently applying an electric current to two windings of the stepping motor 130. In this case, since the two windings (poles) are concurrently energized, a rotator is positioned and stopped at a middle of two windings. According to the full step mode, the stepping motor 130 can be rotated in four steps for 360 degrees, so that the moving angle of the full step of the stepping motor 130 is 90 degrees.

The half step mode is to drive the stepping motor 130 by alternatively utilizing a one-phase energizing mode and a two-phase energizing mode, so as to halve the step size. According to the half step mode, the stepping motor 130 can be rotated in eight steps for 360 degrees, so that the moving angle of the stepping motor 130 in the half step mode every step is 45 degrees.

In the case where the stepping motor 130 is accelerated or decelerated in the full step mode or half step mode, the resulting vector quantity is large, thereby causing a lens of the optical pickup head 120 to vibrate.

By contrast, the micro-step mode transforms sinusoidally the energizing current between adjoining phases of the motor 130, so as to enable positioning at the middle region of a basic step angle. In the micro-step mode, since the stepping motor 130 can be rotated by a sine wave, the stepping motor 130 can rotate at several micro-steps (such as 16 steps, 32 steps, 64 steps or the like) for 360 degrees. By way of example, the step angle of the stepping motor 130 can be 22.5 degrees, 11.25 degrees, 5.625 degrees and so forth in the micro-step mode. However, it is understood that other micro-step modes can be devised according to aspects of the invention.

Since the stepping motor 130 rotates at each step by the sine wave, the micro-step mode has significantly small vector quantity as compared to the vector quantity of the full step mode or the half step mode. Therefore, the micro-step mode is suitable to minutely move the optical pickup head 120 without causing a vibration.

The controller 140 controls the spindle motor 110 rotating the optical disk 100 and the stepping motor 130 moving the optical pickup head 120. The controller 140 controls the stepping motor 130 by use of the full step mode, the half step mode or the micro-step mode according to aspects of the invention. A method embodiment for controlling the stepping motor 130 by the controller will now be described with reference to FIG. 2.

The controller 140 can determine whether the controller 14b accelerates the optical pickup head 120 (S200). In the shown embodiment, where the optical pickup head 120 is accelerated or decelerated, a different control mode can be applied to the stepping motor 130. However, it is understood that the controller 140 need not use a mode for both acceleration and deceleration such that operation S200 is not required in all aspects of the invention.

In the case where the stepping motor 130 is accelerated, the controller 140 can set an initial stage of the stepping motor 130 if the optical pickup head 120 is to be accelerated. However, it is understood that the setting the initial stage need not be performed in all aspects of the invention. If the moving step of the stepping motor 130 is abruptly ran to accelerate the optical pickup head 120, the lens mounted to the optical pickup head 120 may be vibrated. Accordingly, the initial stage can also be set in such a manner that the stepping motor 130 is slowly accelerated at the initial stage and then is rapidly accelerated after the initial stage. The controller 140 can also set the initial stage, for example, as three or more steps on the basis of the half step mode according to an aspect of the invention. However, it is understood that the number of steps can be otherwise set using other step modes.

When the initial stage is set, for example, the controller 140 can also apply the micro-step mode to the stepping motor 130 (S202). Since the stepping motor 130 rotates in the micro-step mode, the stepping motor 130 can rotate at several steps for 360 degrees. The more the number of the steps is, the less the lens vibrates when the optical pickup head 120 moves.

In operation S202, the controller 140 can also apply a sequentially reduced number of the steps of the micro-step mode to each step of the set initial stage according to an aspect of the invention. For example, in the case where the number of the initial stage is set as three steps, at a first step mode, the stepping motor 130 is moved in the micro-step mode to which 64 steps are applied, at a second step mode, the stepping motor 130 is moved in the micro-step mode to which 32 steps are applied, and a third step mode, the stepping motor 130 is moved in the micro-step mode to which 16 steps are applied. However, it is understood that other numbers of steps can be used and that more or less than three step modes can be used in the initial step. As such, the stepping motor 130 can be sequentially accelerated at the step angle of 5.625 degrees at the first step mode, at the step angle of 11.25 degrees at the second step mode, and at the step angle of 22.5 degrees at the third step mode, for example.

After the stepping motor 130 is rotated at the initial stage in operation S202, the controller 140 can apply the full step mode or the half step mode to the stepping motor 130 to accelerate the movement of optical pickup head 120 (S204).

In the case where the full step mode is applied to the stepping motor 130 after the initial stage, the stepping motor 130 rotates by 90 degrees per step. Alternatively, when the half step mode is applied to the stepping motor 130 after the initial step, the stepping motor 130 rotates by 45 degrees per step.

After operation S204, the controller 140 can control the stepping motor 130 to determine whether the movement of the optical pickup head 120 is accelerated to a predetermined/desired speed (S206). If the stepping motor 130 is accelerated to the predetermined speed, the controller 140 can then perform the optical pickup process. Otherwise, the controller 140 repeats operations S202 through S206. However, it is understood that operation S206 can be otherwise performed and need not be performed in all aspects of the invention.

When the optical pickup head 120 is accelerated according to an aspect of the invention, the stepping motor 130 is not abruptly rotated but is gradually accelerated, thereby minimizing the vibration of the lens mounted to the optical pickup head 120.

In the case of decelerating the movement of the optical pickup head as determined in operation S200, the controller 140 can be set with a late step of the stepping motor 130. Specifically, if the stepping motor 130 is abruptly moved to decelerate the optical pickup head 120, the lens mounted to the optical pickup head 120 may be vibrated. Accordingly, a late step may be set by the controller 140 such that the stepping motor 130 is rapidly accelerated at the initial stage, and then is slowly decelerated. The controller 140 can also set a micro-step mode, for example, as three or more steps. However, it is understood that other numbers of steps can be used, and that a separate setting operation is not required in all aspects of the invention.

After the late step is set, for example, the controller 140 may apply the full step mode or the half step mode to the stepping motor 130 to decelerate the optical pickup head 120 (S208). In the case of applying the full step mode to the stepping mode 130, the stepping motor 130 can rotate by 90 degrees per step and then decelerate, while in the case of applying the half step mode to the stepping mode 130, the stepping motor 130 can rotate by 45 degrees per step and then decelerate.

After the optical pickup head 120 is decelerated by applying the full step mode or the half step mode to the stepping mode, the controller 140 can also apply the micro-step mode to the stepping mode 130 (S210). In the micro-step mode, since the stepping motor 130 rotate by the sine wave, the stepping motor can rotate at several steps for 360 degrees. Accordingly, the more the number of the steps is, the less the lens vibrates when the optical pickup head 120 moves.

The controller 140 can apply a sequentially increased number of the steps of the micro-step mode to each step of the set late step. For example, where the number of the late step is set as three steps, at a first step mode, the stepping motor 130 can be moved in the micro-step mode to which 16 steps are applied, at a second step mode, the stepping motor 130 can be moved in the micro-step mode to which 32 steps are applied, and a third step mode, the stepping motor 130 can be moved in the micro-step mode to which 64 steps are applied. As such, the stepping motor 130 can be sequentially decelerated at the step angle of 22.5 degrees at the first step mode, at the step angle of 11.25 degrees at the second step mode, and at the step angle of 5.625 degrees at the third step mode, for example. However, it is understood that more or less numbers of step modes can be used, and that each step mode can have other numbers of steps.

The controller 140 can then control the stepping motor 130 to determine whether the optical pickup head 120 is decelerated by a desired speed. If the stepping motor 130 is decelerated by the desired speed, the controller 140 can perform the optical pickup process.

When the movement of the optical pickup head 120 is decelerated according to an aspect of the invention, the stepping motor 130 is not excessively ran, but is gradually decelerated, thereby minimizing the vibration of the lens mounted to the optical pickup head 120.

As described above, the present invention can minimize lens vibration of the optical pickup head by employing a micro-step mode at deceleration or acceleration of the stepping motor, which moves the optical pickup head. Accordingly, the lens of the optical pickup head is stabilized, so that the time to stably servo the lens can be quickly applied in relation to the prior art.

While aspects of the present invention has been particularly shown and described with reference to exemplary embodiments depicted in the drawings, it will be understood by those of ordinary skill in the art that various changes and modifications in form and details may be made therein without departing from the spirit and scope of the present invention. Therefore, the true spirit and scope for protection of the present invention will be defined by the following claims and equivalents thereof.

What is claimed is:

1. A method for controlling a spindle motor to rotate a disc, an optical pickup head to transfer data with respect to the disc, and a stepping motor to move an optical pickup head to transfer data with respect to locations on the disc, the method comprising:
    applying a first micro-step mode to the stepping motor to speed up a movement of the optical pickup head gradually to a first speed;
    applying a first full step mode or a first half step mode to the stepping motor to accelerate the movement of the optical pickup head from the first speed to a first predetermined speed;
    applying a second full step mode or a second half step mode to the stepping motor to decelerate the movement of the optical pickup head from the first predetermined speed to a second speed prior to decelerating to a second predetermined speed; and
    applying a second micro-step mode to the stepping motor to slow down a movement of the optical pickup head gradually from the second speed to the second predetermined speed.

2. A computer readable medium encoded with processing instructions for implementing the method of claim 1 using a computer.

3. An optical pickup comprising:
    a spindle motor to rotate a disc;
    an optical pickup head to transfer data with respect to the disc;
    a stepping motor to move the optical pickup head to transfer data with respect to locations on the disc; and
    a controller to control the stepping motor to move the optical pickup head,
    wherein the controller applies a first micro-step mode to the stepping motor to speed up a movement of the optical pickup head gradually to a first speed,
    applies a first full step mode or a first half step mode to the stepping motor to accelerate the movement of the optical pickup head from the first speed to a first predetermined speed,
    applies a second full step mode or a second half step mode to the stepping motor to decelerate the movement of the optical pickup head from the first predetermined speed to a second speed prior to decelerating to a second predetermined speed, and applies a second micro-step mode to the stepping motor to slow down a movement of the optical pickup head gradually from the second speed to the second predetermined speed.

4. The optical pickup of claim 3,
wherein the first micro-step mode comprises a plurality of step modes.

5. The optical pickup of claim 4,
wherein the plurality of step modes each comprises steps of corresponding size, and the steps of sequentially adjacent step modes are sequentially reduced.

6. The optical pickup of claim 3,
wherein the first micro-step mode comprises at least one step mode.

7. The optical pickup of claim 3,
wherein the first micro-step mode comprises a first step mode and a second step mode.

8. The optical pickup of claim 7,
wherein the first micro-step mode further comprises a third step mode.

9. The optical pickup of claim 8,
wherein the first step mode has a first number of steps, the second step mode has a second number of steps that is less than the first number of steps, and the third step mode has a third number of steps that is less than the second number of steps.

10. The optical pickup of claim 9,
wherein the first step mode has 64 steps, the second step mode has 32 steps and the third step has 16 steps.

11. The optical pickup of claim 7,
wherein the first step mode has a greater number of the steps as compared to a number of steps of the second step mode.

12. The optical pickup of claim 3,
wherein the second micro-step mode comprises a plurality of step modes.

13. The optical pickup of claim 12,
wherein each of the plurality of step modes comprises a plurality of steps having a corresponding size, wherein sequentially adjacent step modes have a step size that is sequentially increased as compared to a step size of an adjacent step mode.

14. The optical pickup of claim 3
wherein the second micro-step mode comprises at least one step mode.

15. The optical pickup of claim 3,
wherein the second micro-step mode comprises a first step mode and a second step mode.

16. The optical pickup of claim 15,
wherein the second micro-step mode further comprises a third step mode.

17. The optical pickup of claim 16,
wherein the first step mode has a first number of steps, the second step mode has a second number of steps that is greater than the first number of steps, and the third step mode has a third number of steps that is greater than the second number of steps.

18. The optical pickup of claim 16,
wherein the first step mode has 16 steps, the second step mode has 32 steps and the third step has 64 steps.

19. The optical pickup of claim 15,
wherein the first step mode has a less number of the steps than a number of steps of the second step mode.

* * * * *

UNITED STATES PATENT AND TRADEMARK OFFICE
CERTIFICATE OF CORRECTION

PATENT NO.         : 7,701,162 B2                                              Page 1 of 1
APPLICATION NO.    : 11/038085
DATED              : April 20, 2010
INVENTOR(S)        : Jong-jin Lee It is certified that error appears in the above-identified patent and that said Letters Patent is hereby corrected as shown below:

Column 8, Line 14, change "claim 3" to --claim 3,--.

Signed and Sealed this

Seventeenth Day of August, 2010

David J. Kappos
*Director of the United States Patent and Trademark Office*